United States Patent
Iwamoto et al.

(10) Patent No.: US 11,560,965 B2
(45) Date of Patent: Jan. 24, 2023

(54) VALVE DEVICE

(71) Applicant: JTEKT CORPORATION, Osaka (JP)

(72) Inventors: Natsuki Iwamoto, Okazaki (JP); Kazushi Numazaki, Toyota (JP); Tomohiro Ishihara, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 79 days.

(21) Appl. No.: 17/346,774

(22) Filed: Jun. 14, 2021

(65) Prior Publication Data

US 2021/0396327 A1    Dec. 23, 2021

(30) Foreign Application Priority Data

Jun. 23, 2020  (JP) ............................ JP2020-107927
Jun. 23, 2020  (JP) ............................ JP2020-107928

(51) Int. Cl.
*F16K 31/06*    (2006.01)
*F16K 27/00*    (2006.01)
*F16K 39/02*    (2006.01)
*H01M 8/04089*  (2016.01)

(52) U.S. Cl.
CPC ........ *F16K 31/0668* (2013.01); *F16K 27/003* (2013.01); *F16K 31/0655* (2013.01); *F16K 39/024* (2013.01); *H01M 8/04089* (2013.01)

(58) Field of Classification Search
CPC .. F16K 31/0655; F16K 39/024; F16K 27/003; F16K 31/0668
See application file for complete search history.

(56) References Cited

U.S. PATENT DOCUMENTS

| | | | | |
|---|---|---|---|---|
| 5,341,844 | A * | 8/1994 | Wass | F16K 1/305 |
| | | | | 222/3 |
| 9,644,793 | B2 * | 5/2017 | Lee | F17C 13/04 |
| 9,831,507 | B2 * | 11/2017 | Nomichi | F16K 31/426 |
| 10,041,607 | B2 * | 8/2018 | Becker | F16K 31/0693 |
| 10,337,643 | B2 * | 7/2019 | Hausmann | F16K 31/0655 |
| 10,612,677 | B2 * | 4/2020 | John | B63C 9/24 |
| 10,890,271 | B2 * | 1/2021 | Numazaki | F16K 27/029 |
| 11,448,329 | B2 * | 9/2022 | Numazaki | F16K 31/408 |
| 2005/0103382 | A1 * | 5/2005 | Carter | F16K 31/406 |
| | | | | 137/487.5 |
| 2013/0175462 | A1 * | 7/2013 | Suzuki | F16K 39/024 |
| | | | | 251/30.01 |

FOREIGN PATENT DOCUMENTS

| | | |
|---|---|---|
| JP | 2011-163522 A | 8/2011 |
| JP | 2019-87516 A | 6/2019 |

* cited by examiner

*Primary Examiner* — Umashankar Venkatesan
(74) *Attorney, Agent, or Firm* — Oblon, McClelland, Maier & Neustadt, L.L.P.

(57) ABSTRACT

A valve device includes a body, a solenoid valve, and a manual valve mounted to the body. The manual valve being configured to open and close the gas flow channel via a manual operation. The gas flow channel includes a first flow channel including the valve-side opening portion, and a second flow channel including the tank-side opening portion, and includes an intersection portion in which a first center axis that is a center axis of the first flow channel and a second center axis that is a center axis of the second flow channel intersect with each other. A center axis of the solenoid valve coincides with an extension line of the first center axis and a center axis of the manual valve coincides with an extension line of the second center axis.

7 Claims, 8 Drawing Sheets

VALVE DEVICE

CROSS-REFERENCE TO RELATED APPLICATION

This application claims priority to Japanese Patent Application No. 2020-107927 filed on Jun. 23, 2020 and Japanese Patent Application No. 2020-107928 filed on Jun. 23, 2020, each incorporated herein by reference in its entirety.

BACKGROUND

1. Technical Field

The present disclosure relates to a valve device.

2. Description of Related Art

A valve device is mounted to a fitting of a tank that receives high-pressure gas. The valve device controls charge and discharge of gas to or from the tank. The valve device includes a body including a gas flow channel in which the gas flows, and various valves installed in the body, integrally. Some valve devices of such type are equipped with pressure release means for, for example, when a valve breaks down, discharging gas in a tank to release pressure inside the tank.

For example, the valve device in Japanese Patent Application Publication No. 2019-087516 includes a body, a gas flow channel provided in the body, and a plurality of valves for opening and closing the gas flow channel. The first check valve as a valve is provided on one side in the lateral direction of the body, and a closing member is provided on the other side in the lateral direction of the body. Further, the on-off valve as a valve and the second check valve are provided on one side in the vertical direction of the body, and the solenoid valve as a valve is provided on the other side in the vertical direction of the body. A supply pipe for supplying fuel gas is connected to the connector portion of the first check valve of the valve device, and a fuel gas supply pipe for supplying fuel gas to the fuel cell is connected to the connector portion of the second check valve.

In the valve device in Japanese Patent Application Publication No. 2019-087516, for example, the vehicle-mounted gas tank is charged fuel gas by manually operating the on-off valve to open and close and opening and closing the solenoid valve. Further, the fuel gas is supplied to the fuel cell from the vehicle-mounted gas tank by opening and closing the solenoid valve.

SUMMARY

In Japanese Patent Application Publication No. 2019-087516, for example, during maintenance of the valve device, the on-off valve is manually operated with a tool. At this time, the tool may interfere with peripheral devices such as a fuel gas supply pipe, and work may be decreased.

The present disclosure enables curbing a decrease in ease of work involving a manual operation of a manual valve.

A first aspect of the present disclosure provides a valve device. The valve device includes: a body including a gas flow channel; a solenoid valve mounted to the body and a manual valve mounted to the body. The gas flow channel makes a tank-side opening portion that opens toward the inside of a tank and a valve-side opening portion that opens toward the outside communicate with each other. The solenoid valve is configured to open and close the gas flow channel. The manual valve is configured to open and close the gas flow channel via a manual operation. The gas flow channel includes a first flow channel including the valve-side opening portion, and a second flow channel including the tank-side opening portion, and includes an intersection portion in which a first center axis that is a center axis of the first flow channel and a second center axis that is a center axis of the second flow channel intersect with each other. A center axis of the solenoid valve coincides with an extension line of the first center axis and a center axis of the manual valve coincides with an extension line of the second center axis.

With the above configuration, because of the gas flow channel including the intersection portion, the first flow channel and the second flow channel intersect with each other. Then, because of the center axis of the solenoid valve coinciding with the extension line of the first center axis of the first flow channel and the center axis of the manual valve coinciding with the extension line of the second center axis of the second flow channel, the center axis of the solenoid valve and the center axis of the manual valve intersect with each other. As a result, neither the solenoid valve nor the valve-side opening portion is positioned in a surface, to which the manual valve is attached, of the body in an axial view of the valve device along the center axis of the manual valve. Therefore, when the manual valve is manually operated using a tool, interference of tool with the solenoid valve and a connection member for the valve-side opening portion is prevented, enabling curbing a decrease in ease of work involving manual operation of the manual valve.

In the valve device, piping in which the gas flows both at the time of charge of the gas into the tank and at a time of supply of the gas from the tank may be connected to the valve-side opening portion.

With the above configuration, for example, unlike a case where piping for charge of the gas to the tank and piping for supply of the gas from the tank are separately connected to the valve-side opening portion, it is possible to reduce the number of connection members connected to the valve-side opening portion, enabling reduction in number of connection members that hinder manual operation of the manual valve using a tool.

In the valve device, in the gas flow channel, the first flow channel may be on the upstream side of the second flow channel at the time of charge of the gas into the tank. The solenoid valve may be configured to open the gas flow channel at the time of the charge of the gas and may be configured to close the gas flow channel at an end of the charge of the gas. A valve seat that a valve element of the solenoid valve comes into contact with and moves away from may be disposed in the first flow channel that is on the side opposite to the second flow channel relative to the intersection portion.

With the above configuration, the intersection portion is located closer to the inside of the tank relative to the valve seat in a part, between the inside of the tank and the valve seat, of the gas flow channel. Therefore, the pressure inside the tank consistently acts on the intersection portion and change in pressure acting on the intersection portion is small. Accordingly, each time the gas is charged or the gas is supplied, a load due to pressure fluctuation occurring in the intersection portion of intersection between the first flow channel and the second flow channel can be kept small, and thus, an adverse effect on pressure resistance and fatigue life of the gas flow channel can be curbed.

The above configuration enables curbing a decrease in ease of work involving a manual operation of a manual valve.

A second aspect of the present disclosure provides a valve device. The valve device includes: a body including a gas flow channel; a solenoid valve mounted to the body; and a mounting member configured to mount the solenoid valve to the body. The gas flow channel makes a tank-side opening portion that opens toward the inside of a tank and a valve-side opening portion that opens toward the outside communicate with each other. The solenoid valve is configured to open the gas flow channel in a valve opening position and is configured to close the gas flow channel in a valve closing position. The solenoid valve includes a sleeve, a movable core configured to slide inside the sleeve along an axial direction of the sleeve, and a valve element configured to be positioned in the valve opening position and in the valve closing position by moving inside the sleeve along with motion of the movable core. The mounting member is capable of taking a mounting position and an unmounting position. The mounting position is a position in which the sleeve is mounted to the body with the sleeve restricted in position such that the solenoid valve is positioned in a use position in which the valve element is capable of taking the valve opening position and the valve closing position, and the unmounting position is a position in which the sleeve is capable of being moved such that the valve element is positioned in a position in which the valve element opens the gas flow channel.

With the above configuration, when pressure inside the tank is released, positioning the mounting member in the unmounting position enables the sleeve of the solenoid valve to be moved relative to the body. Then, moving the sleeve in a direction away from the body enables the gas flow channel to be opened by the valve element. Then, the tank-side opening portion and the valve-side opening portion can be brought into communication with each other via the gas flow channel, enabling gas in the tank to be discharged to the outside via the tank-side opening portion, the gas flow channel and the valve-side opening portion and enabling releasing the pressure inside the tank. In other words, the pressure inside the tank can be released by operating the mounting member for mounting the solenoid valve to the body. Also, use of the gas flow channel and the valve-side opening portion included in the body as a pressure release flow channel eliminates the need to separately provide dedicated components such as piping and valves for pressure release, and therefore, even the valve device that enables releasing the pressure inside the tank enables curbing an increase in cost and size and causes no decrease in mountability due to provision of dedicated components.

In the valve device, the solenoid valve may include a fixed core fixed to the inner side of the sleeve, and a biasing member disposed between the fixed core and the movable core in the axial direction of the sleeve and configured to bias the valve element to the valve closing position in the mounting position. The unmounting position may be a position in which the valve element is released from the biasing via the biasing member.

With the above configuration, upon the mounting member being positioned in the unmounting position and the sleeve being moved in the direction away from the body, the fixed core moves away from the movable core and the biasing force of the biasing member is eliminated. In other words, the valve element is released from the biasing in a direction in which the valve element closes the gas flow channel. Therefore, at the time of release of the pressure inside the tank, it is possible to move the valve element in a direction in which the valve element opens the gas flow channel, via the pressure inside the tank, enabling the pressure inside the tank to be released via the gas flow channel.

In the valve device, the body may have a mounting hole to which a first end in the axial direction of the sleeve is inserted. The mounting hole may be a female-threaded hole having a female thread at a part of an inner circumferential surface, and the sleeve may include a sleeve-side restriction portion on the second end side relative to the first end of the sleeve, the sleeve-side restriction portion projecting radially from an outer circumferential surface, and may include a sleeve body on the second end side relative to the sleeve-side restriction portion. The mounting member may have an annular shape to which the sleeve body is inserted, and may include a male thread at an outer circumferential surface, the male thread threadably engaging with the mounting hole, and may include a nut-side restriction portion that comes into contact with the sleeve-side restriction portion in the mounting position.

With the above configuration, upon the mounting member being threadably engaged with the mounting hole, the nut-side restriction portion come into contact with the sleeve-side restriction portion, and thus, the sleeve can be mounted to the body in a state in which the sleeve is prevented from coming off from the mounting member. Also, upon the mounting member being threadably retracted from the mounting hole and being positioned in the unmounting position, the sleeve-side restriction portion is released from the contact with the nut-side restriction portion, enabling moving the valve element to the position in which the valve element opens the gas flow channel. Therefore, it is possible to mount the solenoid valve to the body and release the pressure inside the tank, with the mounting member having the simple configuration.

In the valve device, the gas flow channel may include a first flow channel that is on the upstream side at the time of charge of the gas into the tank, a second flow channel that is on the downstream side relative to the first flow channel at the time of the charge of the gas into the tank, and an intersection portion in which the first flow channel and the second flow channel intersect with each other. In the gas flow channel, the solenoid valve that takes the valve opening position at the time of the charge of the gas and that takes the valve closing position at an end of the charge of the gas may be disposed, and a valve seat that the valve element comes into contact with and moves away from may be disposed in the first flow channel that is on the side opposite to the second flow channel relative to the intersection portion.

With the above configuration, the intersection portion is located closer to the inside of the tank relative to the valve seat in a part, between the inside of the tank and the valve seat, of the gas flow channel. Therefore, the pressure inside the tank consistently acts on the intersection portion and change in pressure acting on the intersection portion is small. Accordingly, each time the gas is charged or the gas is supplied, a load due to pressure fluctuation occurring in the intersection portion of intersection between the first flow channel and the second flow channel can be kept small, and thus, an adverse effect on pressure resistance and fatigue life of the gas flow channel can be curbed.

The above configuration enables releasing the pressure inside the tank without providing dedicated components for pressure release.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
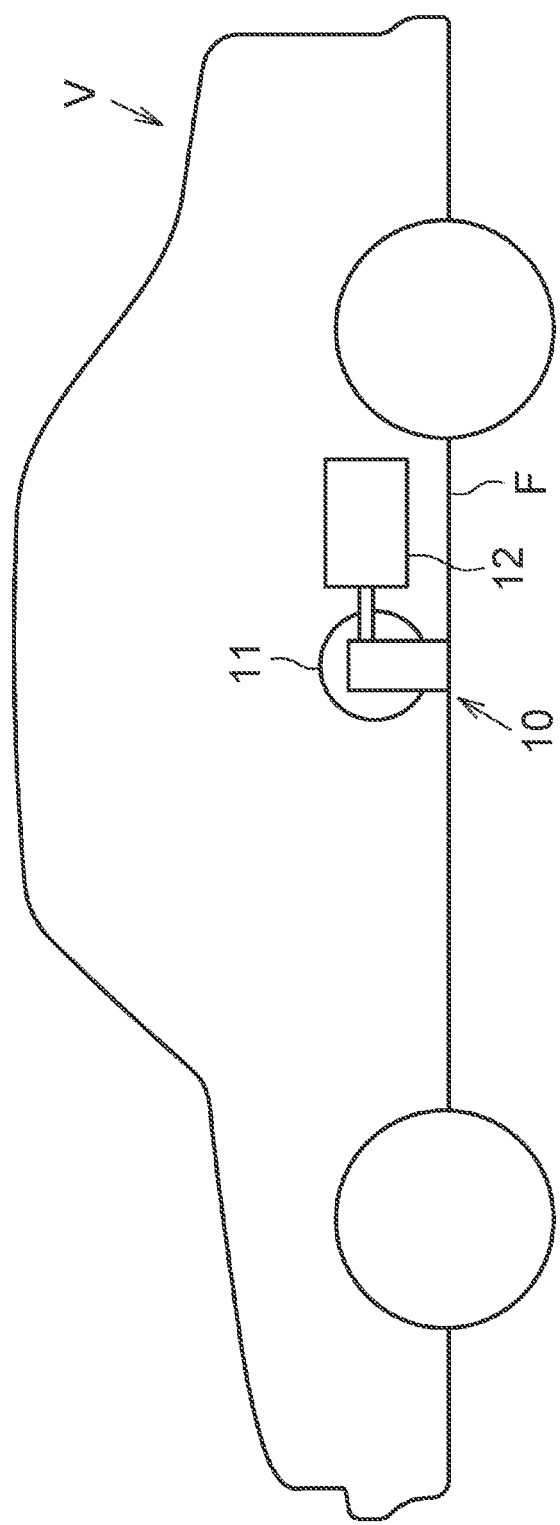
FIG. 1 is a schematic diagram illustrating a gas tank, a valve device and a fuel cell of a fuel cell vehicle.

A embodiment of the valve device will be described with reference to FIGS. 1 to 5. As illustrated in FIG. 1, a valve device 10 of the present embodiment is installed in a fuel cell vehicle V. The fuel cell vehicle V is a vehicle that runs on electricity generated by a fuel cell 12. In the fuel cell vehicle V, the fuel cell 12, a gas tank 11 that serves as a tank storing fuel gas to be supplied to the fuel cell 12, and the valve device 10 mounted to the gas tank 11 are installed. In the present embodiment, in a storage chamber inside the gas tank 11, high-pressure hydrogen gas is stored as the fuel gas.

The gas tank 11, the fuel cell 12 and the valve device 10 are installed under a floor panel in a rear portion of the fuel cell vehicle V. However, the place where the gas tank 11, the fuel cell 12 and the valve device 10 are installed is not limited to the position under the floor panel in the rear portion of the fuel cell vehicle V but may appropriately be changed and, for example, may be, e.g., a place in a front portion of the fuel cell vehicle V or under a trunk compartment. Also, in the present embodiment, in order to enable doing maintenance from below a vehicle body F of the fuel cell vehicle V, the valve device 10 is installed with the lower surface side of the valve device 10 exposed to an area below the vehicle body F.

Figure 2:
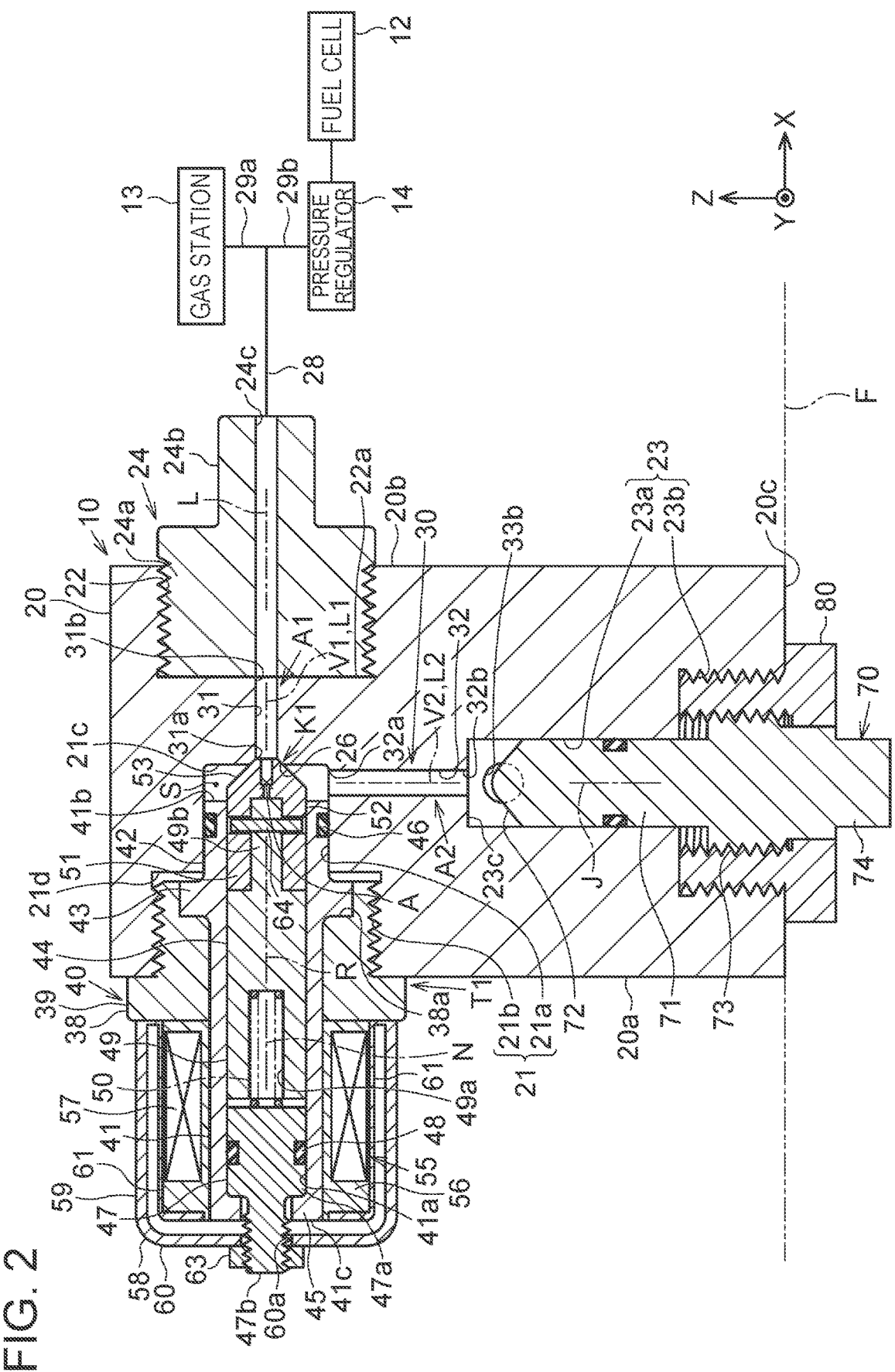
FIG. 2 is a sectional view illustrating a valve device.

As illustrated in FIG. 2, the valve device 10 controls supply of the fuel gas from a gas station 13 to the gas tank 11 and supply of the fuel gas from the gas tank 11 to the fuel cell 12. The valve device 10 includes a body 20, a solenoid valve 40 that opens and closes a gas flow channel 30 included in the body 20, and a manual valve 70 that opens and closes the gas flow channel 30 via a manual operation. In the present embodiment, a first direction of the body 20 is a vehicle front-rear direction X, a second direction orthogonal to the first direction is a vehicle right-left direction Y and a third direction orthogonal to the first direction and the second direction is a vehicle height direction Z.

The body 20 has a form of a block made of an aluminum alloy. The body 20 includes a first mounting hole 21 in a front end surface 20a, which is a first end surface in the first direction, and a second mounting hole 22 in a rear end surface 20b, which is a second end surface in the first direction. Also, the body 20 includes a third mounting hole 23 in a lower end surface 20c.

In the valve device 10, the solenoid valve 40 is installed in the body 20 by being mounted in the first mounting hole 21, which corresponds to the mounting hole. Also, the manual valve 70 is installed in the body 20 by being mounted in the third mounting hole 23. A connector 24 is mounted in the second mounting hole 22. Piping 28 is connected to the connector 24. The piping 28 diverges into charge piping 29a and a supply piping 29b. The gas station 13 is connectable to the charge piping 29a and the fuel cell 12 is connected to the supply piping 29b via a pressure regulator 14. Also, the body 20 includes a later-described tank-side opening portion 33b in a right end surface, which is an end surface in the second direction. The tank-side opening portion 33b opens toward the gas tank 11.

Figure 3:
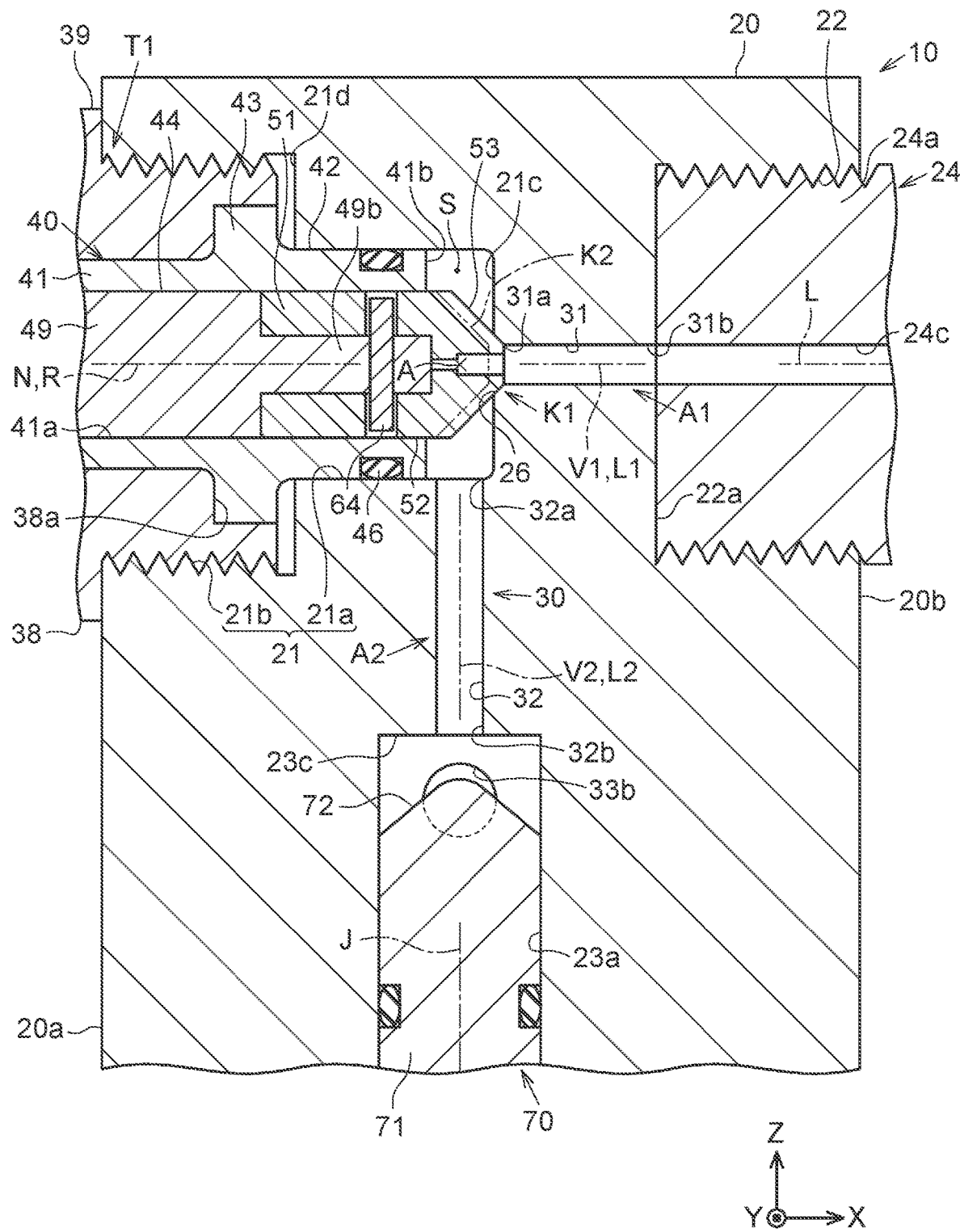
FIG. 3 is an enlarged sectional view illustrating an area around a valve chest of a gas flow channel.

As illustrated in FIG. 2 or 3, the first mounting hole 21 is a stepped female-threaded hole. The first mounting hole 21 includes a large-diameter hole 21b that opens in the front end surface 20a of the body 20, and a small-diameter hole 21a located closer to the rear end surface 20b of the body 20 than the large-diameter hole 21b. The small-diameter hole 21a has a diameter that is smaller than that of the large-diameter hole 21b. The small-diameter hole 21a and the large-diameter hole 21b are located coaxially.

In an inner bottom surface 21c of the small-diameter hole 21a, a first end closer to the small-diameter hole 21a of opposite ends in an axial direction of a first connection flow channel 31 opens as a valve hole 31a. Also, a second end on the opposite side of the first connection flow channel 31 from the valve hole 31a of the opposite ends in the axial direction of the first connection flow channel 31 opens in an inner bottom surface 22a of the second mounting hole 22 as a valve-side opening portion 31b. The first connection flow channel 31 is a flow channel linearly extending in the vehicle front-rear direction X. Therefore, a center axis V1 of the first connection flow channel 31 linearly extends in the vehicle front-rear direction X. A valve seat 26 is provided in a bottom portion of the small-diameter hole 21a. The valve seat 26 is configured by forming an inner circumferential surface of the valve hole 31a into a shape whose diameter increases toward the inner bottom surface 21c of the small-diameter hole 21a.

The large-diameter hole 21b includes a female-thread at an inner circumferential surface. In other words, the large-diameter hole 21b is a female-threaded hole and the first mounting hole 21 including the large-diameter hole 21b can be regarded as a female-threaded hole including a female thread at a part of an inner circumferential surface. Then, a mounting member 38 for mounting the solenoid valve 40 to the body 20 is screwed in the large-diameter hole 21b and the solenoid valve 40 is mounted to the body 20 via the mounting member 38.

Here, the solenoid valve 40 will be described. The solenoid valve 40 includes a sleeve 41, a fixed core 47 fixed inside the sleeve 41, a movable core 49 that slides inside the sleeve 41, a valve element 51 that is attached to the movable core 49 and that slides inside the sleeve 41 along with motion of the movable core 49, a solenoid 55 that drives the movable core 49, and a biasing member 50 that biases the movable core 49.

The sleeve 41 has a cylindrical shape. A direction in which a center axis N of the sleeve 41 extends is an axial direction of the sleeve 41. Also, the center axis N of the sleeve 41 corresponds to a center axis of the solenoid valve 40. In the present embodiment, the center axis N of the sleeve 41 extends in the vehicle front-rear direction X and the axial direction of the sleeve 41 corresponds to the vehicle front-rear direction X. Of opposite ends in the axial direction of the sleeve 41, an end closer to the first mounting hole 21 is a first end 41b and an end on the opposite side of the sleeve 41 from the first end 41b is a second end 41c. The sleeve 41 opens at the first end 41b and the second end 41c in the axial direction. The sleeve 41 includes a sliding hole 41a extending in the axial direction inside.

The sleeve 41 includes an insertion portion 42 including the first end 41b in the axial direction, a disk-like sleeve-side restriction portion 43 located on the second end 41c side relative to the insertion portion 42, and a tubular sleeve body 44 located on the second end 41c side relative to the sleeve-side restriction portion 43. Therefore, the sleeve 41 includes the sleeve-side restriction portion 43 on the second end 41c side relative to the first end 41b and includes the sleeve body 44 on the second end 41c side relative to the sleeve-side restriction portion 43. Note that the second end 41c of the sleeve 41 is configured by an annular cover portion 45. An inner diameter of the sleeve 41 is constant in the axial direction in a part except the cover portion 45 and an outer diameter of the sleeve 41 differs depending on the part.

More specifically, an outer diameter of the insertion portion 42 is smaller than an outer diameter of the sleeve-side restriction portion 43 but is larger than an outer diameter of the sleeve body 44. In the present embodiment, the outer diameter of the insertion portion 42 is larger than the outer diameter of the sleeve body 44; however, the present disclosure is not limited to this example and the outer diameter of the insertion portion 42 may be equal to or smaller than the outer diameter of the sleeve body 44.

Then, the outer diameter of the insertion portion 42 is slightly smaller than an inner diameter of the small-diameter hole 21a and the insertion portion 42 is inserted in the small-diameter hole 21a through the large-diameter hole 21b. A sealing member 46 such as an O-ring is fitted in an outer circumferential surface of the insertion portion 42. The sealing member 46 is in close contact with the outer circumferential surface of the insertion portion 42 and an inner circumferential surface of the small-diameter hole 21a and seals between the outer circumferential surface of the insertion portion 42 and the inner circumferential surface of the small-diameter hole 21a in an airtight manner.

The first end 41b of the sleeve 41 and the inner bottom surface 21c of the small-diameter hole 21a are spaced from each other in the axial direction of the sleeve 41. Then, a valve chest S that receives the later-described valve element 51 is defined by a space surrounded by the first end 41b of the sleeve 41, the inner circumferential surface of the small-diameter hole 21a and the inner bottom surface 21c of the small-diameter hole 21a. The valve hole 31a can communicate with the valve chest S and the valve chest S faces the valve seat 26.

The sleeve-side restriction portion 43 is a disk-like shape that projects radially outward relative to the insertion portion 42 and the sleeve body 44. The outer diameter of the sleeve-side restriction portion 43 is larger than the inner diameter of the small-diameter hole 21a but is smaller than an inner diameter of the large-diameter hole 21b. The sleeve-side restriction portion 43 is not inserted in the small-diameter hole 21a but is located inside the large-diameter hole 21b. A part of the sleeve body 44 is located inside the large-diameter hole 21b and the remaining part of the sleeve body 44 projects to the outside of the body 20.

The fixed core 47 is fixed inside the sleeve 41. The fixed core 47 includes a columnar press-fit portion 47a that is press-fitted into a part of the sliding hole 41a, the part being located in the sleeve body 44, and a shaft portion 47b extending through the cover portion 45. An end surface, closer to the shaft portion 47b, of the press-fit portion 47a is in contact with an inner surface of the cover portion 45 and the contact prevents the fixed core 47 from coming off from the sleeve 41.

A sealing member 48 such as an O-ring is fitted in an outer circumferential surface of the press-fit portion 47a. The sealing member 48 is in close contact with the outer circumferential surface of the press-fit portion 47a and an inner circumferential surface of the sleeve 41 and seals between the outer circumferential surface of the press-fit portion 47a and the inner circumferential surface of the sleeve 41 in an airtight manner. The shaft portion 47b includes a male thread at an outer circumferential surface. The shaft portion 47b extends through the cover portion 45 and projects to the outside of the sleeve 41 relative to the second end 41c of the sleeve 41. A nut 63 threadably engages with the shaft portion 47b.

Here, the mounting member 38 for mounting the solenoid valve 40 to the body 20 will be described. The mounting member 38 has an annular shape to which the sleeve body 44 is inserted. The mounting member 38 is a nut including a male thread at an outer circumferential surface. The sleeve 41 is mounted to the body 20 by the male thread of the mounting member 38 being engaged with the female thread of the large-diameter hole 21b.

The mounting member 38 includes a nut-side restriction portion 38a at an inner circumferential portion. A direction in which a center axis R of the mounting member 38 extends is an axial direction of the mounting member 38. The nut-side restriction portion 38a is formed in such a manner as to be annularly recessed from an end surface in the axial direction of the mounting member 38, the end surface being located inside the first mounting hole 21. Note that an inner diameter of the mounting member 38 is slightly larger than the outer diameter of the sleeve-side restriction portion 43 at an inner circumferential surface of the nut-side restriction portion 38a. The sleeve-side restriction portion 43 is disposed inside the nut-side restriction portion 38a. An inner bottom surface of the nut-side restriction portion 38a is an annular surface flatly extending in a radial direction of the mounting member 38. Then, an annular surface, closer to the second end 41c, of the sleeve-side restriction portion 43 is in contact with the inner bottom surface of the nut-side restriction portion 38a.

The mounting member 38 includes a flange 39 on the outer side of the body 20 in the axial direction. The outer diameter of the mounting member 38 at the flange 39 is larger than the outer diameter of the mounting member 38 at the male thread and is larger than the inner diameter of the large-diameter hole 21b. The mounting member 38 is screwed into the large-diameter hole 21b until the flange 39 comes into contact with the front end surface 20a of the body 20.

As a result of the mounting member 38 being screwed into the large-diameter hole 21b until the flange 39 comes into contact with the front end surface 20a of the body 20, the sleeve 41 is mounted to the body 20 and the solenoid valve 40 is mounted to the body 20. Also, the inner bottom surface of the nut-side restriction portion 38a is in contact with the annular surface of the sleeve-side restriction portion 43 and the contact prevents the sleeve 41 from coming off from the mounting member 38. The above-described state in which the mounting member 38 has been screwed in the large-diameter hole 21b until the flange 39 comes into contact with the front end surface 20a of the body 20 is assumed as a mounting position T1 of the mounting member 38. In the mounting position T1, the sleeve 41 is mounted to the body 20 in such a manner as to be restricted in position.

In the mounting position T1, the inner bottom surface of the nut-side restriction portion 38a is in contact with the annular surface, closer to the sleeve body 44, of the sleeve-side restriction portion 43. Also, in the mounting position T1, an annular surface, closer to the insertion portion 42, of the sleeve-side restriction portion 43 is spaced from the inner bottom surface of the large-diameter hole 21b and the first end 41b of the sleeve 41 is spaced from the inner bottom surface 21c of the small-diameter hole 21a. In other words, in the mounting position T1, the sleeve 41 is mounted at a position at which the sleeve 41 defines the valve chest S.

Figure 7:
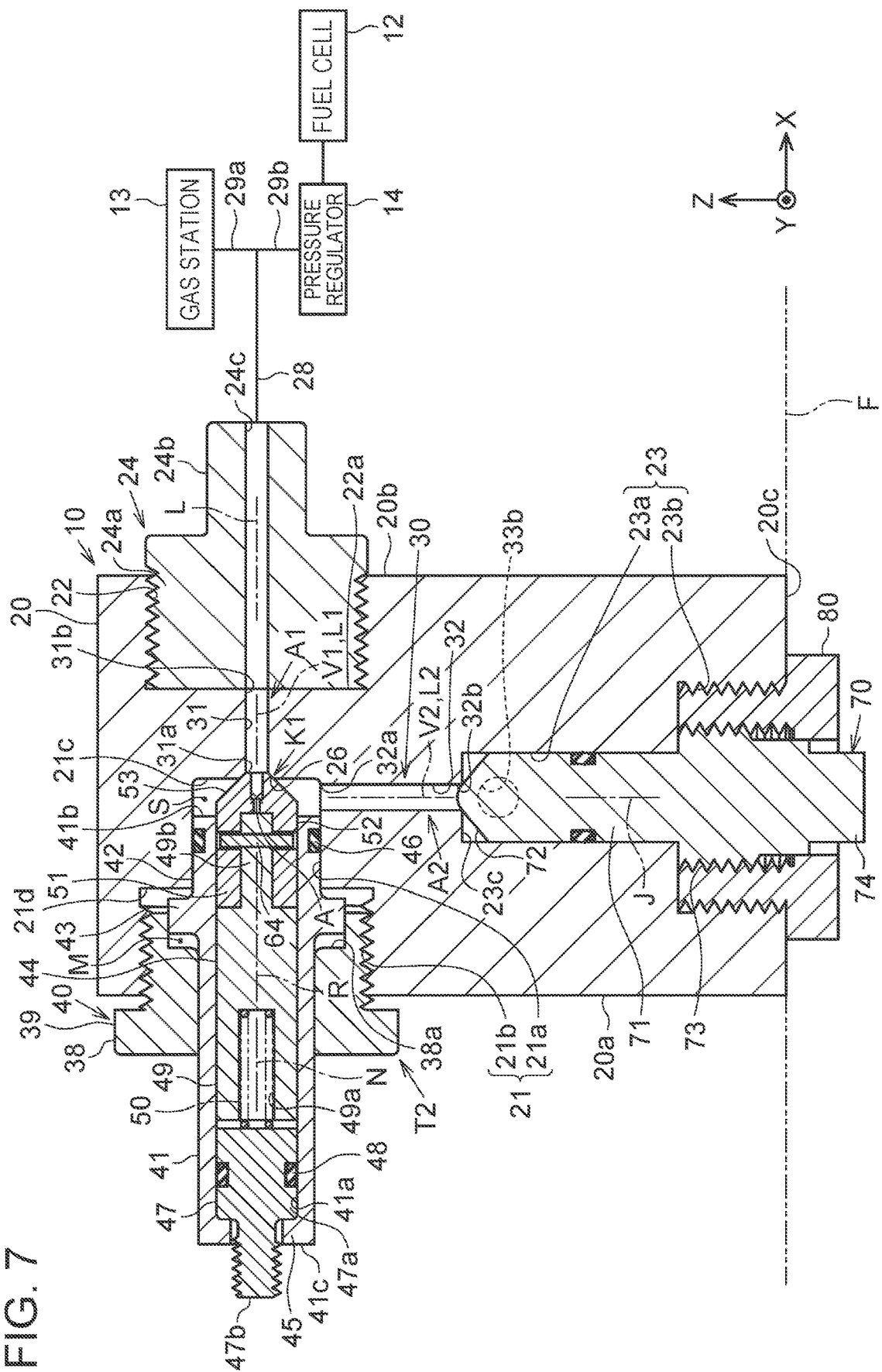
FIG. 7 is a sectional view of a state in which a mounting member is positioned in an unmounting position.
Figure 8:
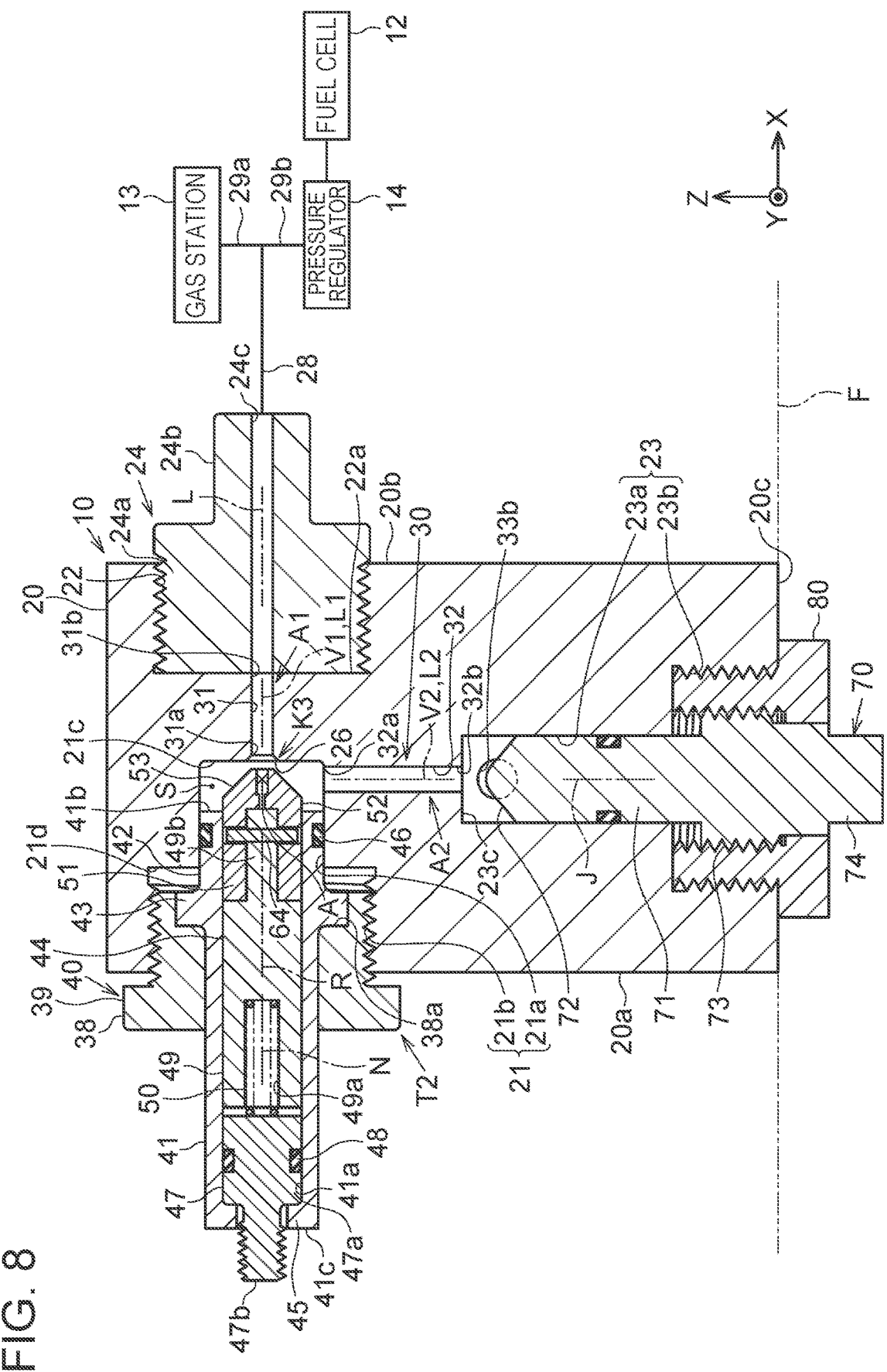
FIG. 8 is a sectional view of a state in which a valve element has been moved together with a sleeve.

Also, as illustrated in FIG. 7 or 8, the mounting member 38 is in an unmounting position T2 that is different from the mounting position T1. The unmounting position T2 is a position in which the sleeve 41 can be moved relative to the body 20. The unmounting position T2 will be described in detail later. Also, the following description of the solenoid valve 40 is a description where the mounting member 38 is in the mounting position T1 and the sleeve 41 is mounted to the body 20.

As illustrated in FIG. 2 or 3, the movable core 49 is received in the sliding hole 41a of the sleeve 41 in such a manner as to be slidable in the axial direction of the sleeve 41. The movable core 49 has a columnar shape. An outer diameter of the movable core 49 is slightly smaller than the inner diameter of the sleeve 41. The movable core 49 includes a receiving portion 49a formed in such a manner as to be recessed in a columnar shape from an end surface facing the fixed core 47. The biasing member 50 is received inside the receiving portion 49a. The biasing member 50 is, for example, a coil spring but may be a leaf spring or rubber. In other words, the configuration of the biasing member 50 may appropriately be changed as long as the resulting configuration enables biasing the movable core 49 toward the valve seat 26.

A first end of the biasing member 50 is in contact with an inner bottom surface of the receiving portion 49a and a second end of the biasing member 50 is in contact with the press-fit portion 47a of the fixed core 47. In a compressed state, the biasing member 50 is disposed between the movable core 49 and the fixed core 47 and biases the movable core 49 toward the valve seat 26 using a force of restoring from the compressed state as a biasing force. In the present embodiment, the biasing force of the biasing member 50 is set to be smaller than a load applied by supply pressure of the fuel gas from the gas station 13.

A part of the valve element 51 attached to the movable core 49 is inserted in the sliding hole 41a of the sleeve 41. The valve element 51 is attached to an end portion on the opposite side of the movable core 49 from an end portion with the receiving portion 49a provided therein of opposite end portions in an axial direction of the movable core 49. The valve element 51 includes a cylindrical body portion 52 and a sealing portion 53 projecting in a conical shape from the body portion 52 toward the valve seat 26.

An outer diameter of the body portion 52 is slightly smaller than the inner diameter of the sleeve 41. A joining portion 49b projecting from the movable core 49 toward the valve element 51 is inserted inside the body portion 52. The joining portion 49b and the body portion 52 are joined by a support pin 64. The support pin 64 is loosely inserted in the body portion 52 and the valve element 51 is thus attached to the movable core 49. Then, the valve element 51 can be moved along with motion of the movable core 49.

The sealing portion 53 comes into contact with and moves away from the valve seat 26 along with motion of the movable core 49. The sealing portion 53 has a diameter decreasing from the body portion 52 to a distal end of the sealing portion 53 along the axial direction of the sleeve 41. An outer circumferential surface of the sealing portion 53 is a conical sealing surface. The diameter at the distal end of the sealing portion 53 is slightly smaller than a diameter of the valve hole 31a and the distal end of the sealing portion 53 is inserted inside the valve hole 31a. As a result of the distal end of the sealing portion 53 being inserted inside the valve hole 31a and the sealing surface thereby coming into contact with the valve seat 26, the valve hole 31a is closed and the communication between the valve-side opening portion 31b and the valve chest S is shut off. In the solenoid valve 40, a position in which the sealing portion 53 is seated on the valve seat 26 by the biasing force of the biasing member 50 and the valve hole 31a is closed by the valve element 51 is assumed as a valve closing position K1.

Figure 5:
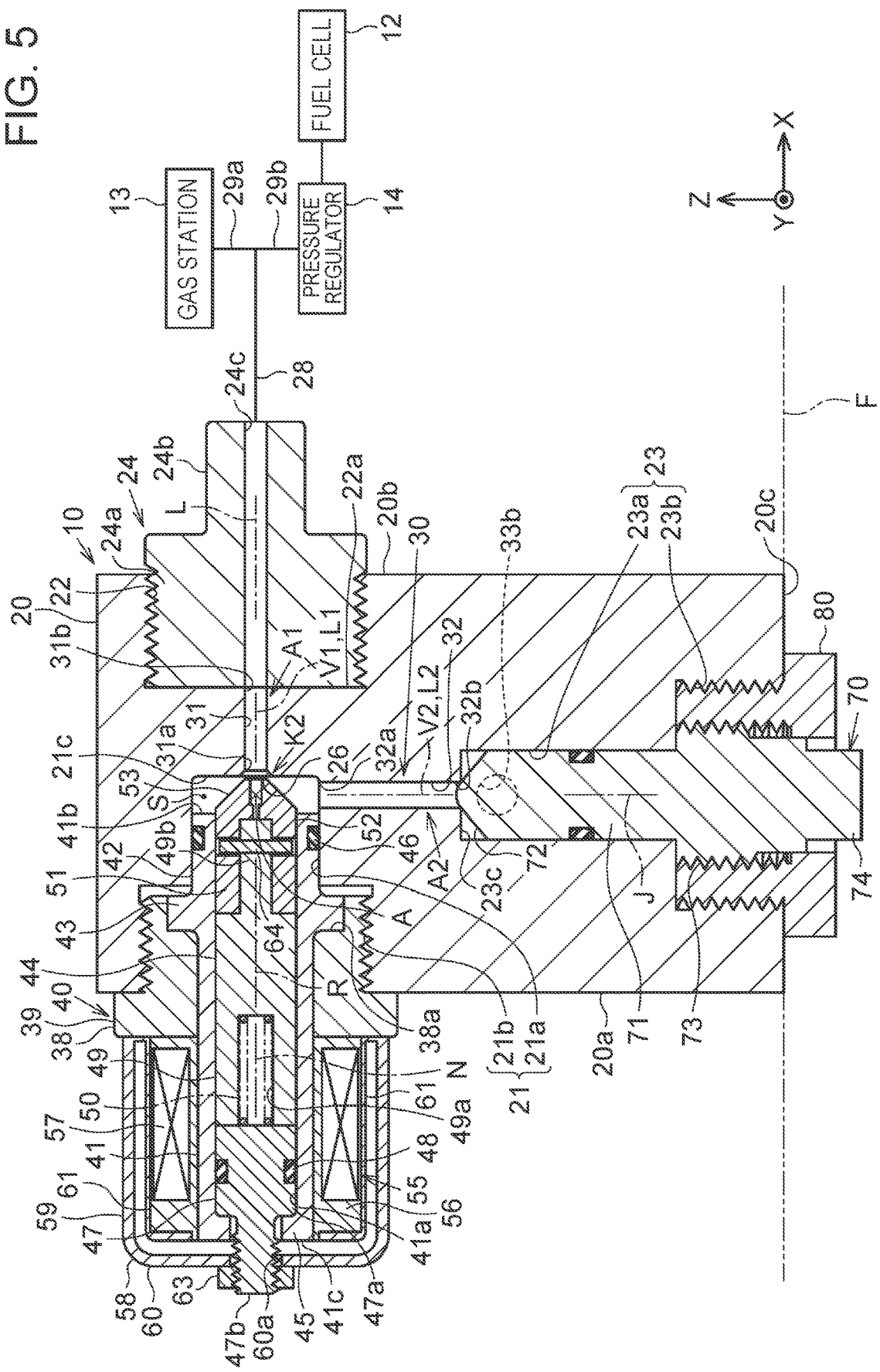
FIG. 5 is a sectional view illustrating a state in which a solenoid valve is positioned in a valve opening position.

On the other hand, as illustrated in FIG. 5, upon electric power being supplied to the later-described solenoid 55 and the movable core 49 being moved and coming into contact with the fixed core 47 against the biasing force of the biasing member 50, the valve element 51 is moved away from the valve seat 26, together with the movable core 49. Then, the sealing portion 53 is moved away from the valve seat 26 and the valve hole 31a is thus opened. As indicated by an alternate long and two short dashes line in FIG. 3, in the solenoid valve 40, a position in which the sealing portion 53 is spaced from the valve seat 26 and the valve hole 31a is opened is assumed as a valve opening position K2. In the valve opening position K2, the valve-side opening portion 31b and the valve chest S communicate with each other. In other words, the solenoid valve 40 opens and closes the valve hole 31a.

Then, when the mounting member 38 is in the mounting position T1, the valve element 51 of the solenoid valve 40 is capable of taking either of two positions, the valve opening position K2 and the valve closing position K1. A position that enables taking either of the two positions, the valve opening position K2 and the valve closing position K1, are assumed as a use position of the solenoid valve 40. Then, when the mounting member 38 is in the mounting position T1, the mounting member 38 mounts the sleeve 41 to the body 20 with the sleeve 41 restricted in position such that the solenoid valve 40 is positioned in a use position in which the valve element 51 can take the valve closing position K1 or the valve opening position K2.

As illustrated in FIG. 2, the solenoid 55 generates motive power for driving the movable core 49, by being supplied with electric power. The solenoid 55 includes a cylindrical bobbin 56 disposed on the outer circumferential side of the sleeve body 44 and a winding 57 provided on an outer circumference of the bobbin 56.

The solenoid valve 40 includes a cover 58 covering the sleeve body 44 including the solenoid 55. Of opposite ends in an axial direction of the cover 58, an end that is more distant from the body 20 is a first end and an end closer to the body 20 is a second end. The cover 58 includes a tubular outer circumferential wall 59, a top board 60 provided at the first end in the outer circumferential wall 59, and an inner circumferential wall 61 that forms a dual-tube structure on the inner side of the outer circumferential wall 59 and that is continuous with the second end in the outer circumferential wall 59.

The cover 58 has a tubular shape that opens at the second end of the outer circumferential wall 59. The cover 58 includes a through-hole 60a at a center portion of the top board 60. Also, the bobbin 56 with the winding 57 wound thereon is integrated with an inner circumferential surface of the inner circumferential wall 61 of the cover 58. Therefore, the solenoid 55 is integrated with the cover 58.

The shaft portion 47*b* of the fixed core 47 extending through the cover portion 45 of the sleeve 41 extends through the through-hole 60*a* of the cover 58. As described above, the nut 63 threadably engages with the male thread of the shaft portion 47*b* extending through the cover 58. The threadable engagement of the nut 63 with the shaft portion 47*b* makes the second end of the cover 58 be pressed against the flange 39 of the mounting member 38 and makes the cover 58 be mounted to the solenoid valve 40. Then, the solenoid 55 is covered by the outer circumferential wall 59 and the top board 60 of the cover 58.

In the solenoid valve 40 having the above configuration, by positioning the mounting member 38 in the mounting position T1, the sleeve 41 is mounted to the body 20 with the sleeve 41 restricted in position, and by positioning the mounting member 38 in the unmounting position T2, the sleeve 41 is made movable relative to the body 20.

As illustrated in FIG. 7, the unmounting position T2 is a position in which the mounting member 38 positioned in the mounting position T1 has been threadably retracted by a predetermined amount from the large-diameter hole 21*b*. Note that in order to move the mounting member 38 positioned in the mounting position T1 to the unmounting position T2, it is necessary to remove the cover 58 and the solenoid 55 from the sleeve 41. In order to remove the cover 58 and the solenoid 55 from the sleeve 41, the nut 63 that threadably engages with the shaft portion 47*b* of the fixed core 47 is threadably retracted from the shaft portion 47*b*. Next, the cover 58 is removed from the shaft portion 47*b*. Since the solenoid 55 is integrated with the inner circumferential wall 61 of the cover 58, the solenoid 55 is removed from the sleeve 41, together with the cover 58. As a result, the cover 58 and the solenoid 55 are removed from the sleeve 41. Subsequently, the mounting member 38 is threadably retracted by a predetermined amount.

Along with the threadable retraction of the mounting member 38 from the large-diameter hole 21*b*, the inner bottom surface of the nut-side restriction portion 38*a* is moved away from the annular surface of the sleeve-side restriction portion 43 and a space M is thus formed. Using the space M, the sleeve 41 can be moved in a direction away from the body 20 in the axial direction.

In the present embodiment, a dimension of the space M is set in such a manner as to, when the sleeve 41 is moved, prevent the sealing member 46 from coming off from the small-diameter hole 21*a*. In other words, the dimension of the space M is set in such a manner as to, when the sleeve 41 is moved, enable maintenance of the airtight sealing between the outer circumferential surface of the insertion portion 42 and the inner circumferential surface of the small-diameter hole 21*a* by the sealing member 46. In order to prevent the sealing member 46 from coming off from the small-diameter hole 21*a*, it is essential to set a maximum amount of movement of the sleeve 41 to be a distance from the sealing member 46 to the inner bottom surface 21*d* of the large-diameter hole 21*b* in the use position of the solenoid valve 40. Then, an amount of the threadable retraction of the mounting member 38 is set such that the dimension of the space M formed when the mounting member 38 is threadably retracted is smaller than the distance, and the set amount of threadable retraction corresponds to a predetermined threadable retraction amount.

As illustrated in FIG. 8, upon the mounting member 38 being positioned in the unmounting position T2 to move the sleeve 41 in the direction away from the body 20 by the space M, the fixed core 47 integrated with the sleeve 41 is moved away from the movable core 49. Then, the biasing member 50 located between the fixed core 47 and the movable core 49 is released from the compressed state and the movable core 49 is released from the biasing via the biasing member 50. As a result of the release from the biasing via the biasing member 50, the valve element 51 can easily move to a position in which the biasing member 50 opens the valve hole 31*a*. The present embodiment is configured such that, upon release from the biasing via the biasing member 50, the valve element 51 can be moved to the position in which the valve element 51 opens the valve hole 31*a*, by pressure inside the gas tank 11. Therefore, by positioning the mounting member 38 in the unmounting position T2, the sleeve 41 can be moved such that the valve element 51 is positioned in the position in which the valve element 51 opens the gas flow channel 30.

By positioning the mounting member 38 in the unmounting position T2, it is possible to, even if the valve element 51 is in the valve closing position K1, make the valve element 51 open valve hole 31*a* upon reception of the pressure inside the gas tank 11. In other words, by positioning the mounting member 38 in the unmounting position T2, the valve element 51 can be positioned in a position in which the gas flow channel 30 and the valve-side opening portion 31*b* and the tank-side opening portion 33*b* communicate with each other. This position is assumed as a gas release position K3 of the solenoid valve 40. The gas release position K3 is a position that is different from the valve closing position K1 and the valve opening position K2.

Note that when the mounting member 38 is positioned in the mounting position T1, the solenoid valve 40 is in the use position in which the valve element 51 takes either of the two positions, the valve closing position K1 and the valve opening position K2. Then, by positioning the mounting member 38 in the unmounting position T2, the solenoid valve 40 can be positioned in the gas release position K3 in which pressure release of the gas tank 11 is possible, the gas release position K3 being different from the valve closing position K1 and the valve opening position K2.

As illustrated in FIG. 2 or 3, in the body 20, the second mounting hole 22 is a female-threaded hole with a female thread formed at an inner circumferential surface. The connector 24 is screwed in the second mounting hole 22. The connector 24 includes a connection portion 24*a* including a male thread at an outer circumferential surface, the male thread being screwed in the second mounting hole 22, and a connector portion 24*b* projecting from the connection portion 24*a* to the outside of the body 20. Also, the connector 24 includes an in-connector flow channel 24*c* extending along a center axis L of the connector 24. Of opposite ends in an axial direction of the in-connector flow channel 24*c*, an end closer to the body 20 is assumed as a first end and an end on the opposite side of the in-connector flow channel 24*c* from the first end is assumed as a second end. The first end of the in-connector flow channel 24*c* communicates with the valve-side opening portion 31*b* of the first connection flow channel 31 and the second end of the in-connector flow channel 24*c* opens outwardly from an end surface of the connector portion 24*b*. Therefore, the valve-side opening portion 31*b* can be regarded as opening to the outside. The piping 28 for both an inlet and an outlet is connected to the connector portion 24*b* and the inside of the piping 28 communicates with the in-connector flow channel 24*c*.

The third mounting hole 23 of the body 20 is a stepped hole. The third mounting hole 23 includes a fastening hole 23*b* that opens to the lower end surface 20*c* of the body 20 and a guide hole 23*a* located on the deep side relative to the fastening hole 23*b*. The fastening hole 23*b* is larger in diameter than the guide hole 23*a*. The guide hole 23*a* and the fastening hole 23*b* are provided coaxially. The guide hole 23*a* is a hole for guiding movement of the manual valve 70. The tank-side opening portion 33*b* is provided in a part in a circumferential direction of an inner circumferential surface of the guide hole 23*a*.

The fastening hole 23*b* is a female threaded hole including a female thread formed at an inner circumferential surface. A fastening member 80 for mounting the manual valve 70 to the body 20 is screwed in the fastening hole 23*b* and the manual valve 70 is thus mounted to the body 20 via the fastening member 80.

Figure 4:
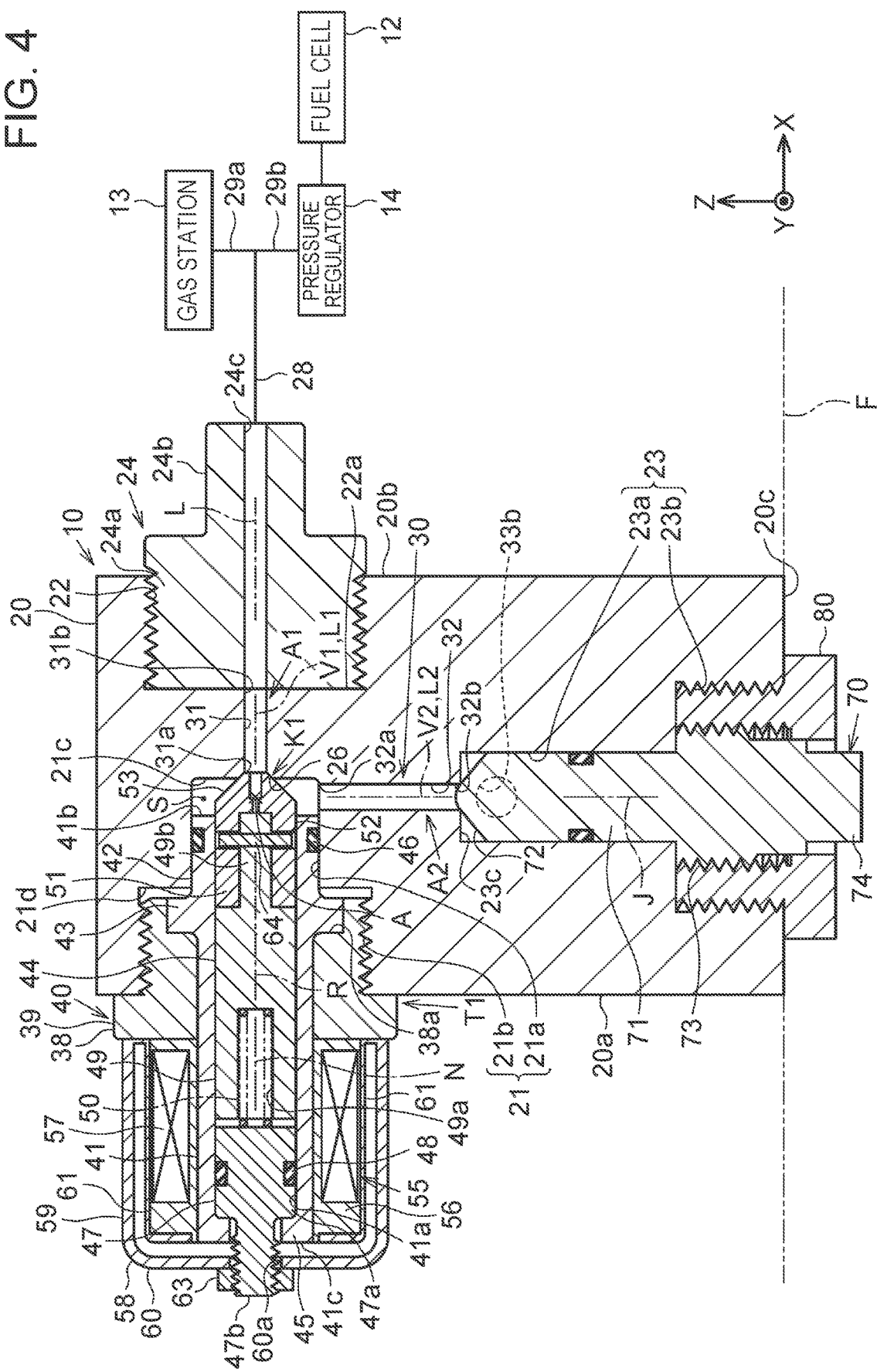
FIG. 4 is a sectional view illustrating a state in which a tank-side opening portion is closed by a manual valve.

As illustrated in FIG. 4, the manual valve 70 includes a guide portion 71 inserted in the guide hole 23*a*, a valve portion 72 that projects from a first end closer to the guide hole 23*a* of opposite ends in an axial direction in which a center axis J of the guide portion 71 extends, and a screw portion 73 that projects from a second end on the opposite side of the guide portion 71 from the first end of the opposite ends in the axial direction of the guide portion 71. Furthermore, the manual valve 70 include an operation portion 74 that projects from the screw portion 73 to the side opposite to the guide portion 71.

The guide portion 71 has a cylindrical shape. The guide portion 71 slides inside the guide hole 23*a*. The valve portion 72 opens and closes a second end 32*b* of a second connection flow channel 32 that communicates with the valve chest S. Note that the second connection flow channel 32 connects the small-diameter hole 21*a* of the first mounting hole 21 and the guide hole 23*a* of the third mounting hole 23. Of opposite ends in an axial direction of the second connection flow channel 32, an end closer to the small-diameter hole 21*a* is assumed as a first end 32*a* and an end closer to the guide hole 23*a* is assumed as a second end 32*b*. The first end 32*a* opens in the inner circumferential surface of the small-diameter hole 21*a* and the second end 32*b* opens in an inner bottom surface 23*c* of the third mounting hole 23. The second connection flow channel 32 is a flow channel linearly extending in the vehicle height direction Z. Therefore, a center axis V2 of the second connection flow channel 32 linearly extends in the vehicle height direction Z.

The screw portion 73 includes a male thread at an outer circumferential surface. The screw portion 73 is larger in outer diameter than the guide portion 71. The operation portion 74 is smaller in diameter than the screw portion 73 and has a hexagonal prism shape. The operation portion 74 is a part to be manually operated using a wrench as a tool. Note that the shape of the operation portion 74 may appropriately be changed and a shape of the tool for manually operating the operation portion 74 is changed according to the shape of the operation portion 74.

The fastening member 80 has an annular shape. The fastening member 80 is a nut including a female-threaded hole in an inner circumferential surface and a male thread at an outer circumferential surface. The fastening member 80 is fastened to the fastening hole 23*b*. The screw portion 73 of the manual valve 70 threadably engages with the inner side of the fastening member 80.

Then, the valve portion 72 can be brought into contact with or be moved away from the second end 32*b* of the second connection flow channel 32 by manually operating the operation portion 74 to threadably advance or retract the screw portion 73 relative to the fastening member 80 and thereby make the guide portion 71 slide inside the guide hole 23*a*. Then, the second connection flow channel 32 and the gas tank 11 can be brought into communication with each other via the tank-side opening portion 33*b* or the communication can be shut off by opening or closing the second end 32*b* of the second connection flow channel 32 via the valve portion 72. In other words, the tank-side opening portion 33*b* can be opened and closed by manual operation of the operation portion 74.

The gas flow channel 30 inside the body 20 is a flow channel that makes the valve-side opening portion 31*b* and the tank-side opening portion 33*b* communicate with each other. The gas flow channel 30 includes a first flow channel A1 including the first connection flow channel 31 and the valve chest S, and a second flow channel A2 including the valve chest S, the second connection flow channel 32 and the guide hole 23*a*. Since the first connection flow channel 31 includes the valve-side opening portion 31*b*, the first flow channel A1 includes the valve-side opening portion 31*b*. Also, since the guide hole 23*a* includes the tank-side opening portion 33*b*, the second flow channel A2 includes the tank-side opening portion 33*b*.

Where a center axis of the first flow channel A1 is assumed as a first center axis L1, the first center axis L1 coincides with the center axis V1 of the first connection flow channel 31. A part of the valve chest S, the part being located at a position on an extension of the first center axis L1 to the side opposite to the valve-side opening portion 31*b* can be regarded as being included in the first connection flow channel 31. Also, where a center axis of the second flow channel A2 is assumed as a second center axis L2, the second center axis L2 coincides with the center axis V2 of the second connection flow channel 32. A part of the valve chest S, the part being located at a position on an extension of the second center axis L2 to the side opposite to the guide hole 23*a*, can be regarded as being included in the second connection flow channel 32.

Then, the gas flow channel 30 includes an intersection portion A in which the first center axis L1 of the first flow channel A1 and the second center axis L2 of the second flow channel A2 intersect with each other. In the present embodiment, the intersection portion A is located in the valve chest S. Then, the valve seat 26 that the valve element 51 of the solenoid valve 40 comes into contact with and moves away from is disposed in the first flow channel A1 on the side opposite to the second flow channel A2 relative to the intersection portion A.

Also, an extension line of extension of the first center axis L1 of the first flow channel A1 included in the gas flow channel 30 to the side opposite to the valve-side opening portion 31*b* coincides with the center axis N of the sleeve 41, which corresponds to the center axis of the solenoid valve 40. In other words, the solenoid valve 40 is located at a position on an extension in the vehicle front-rear direction X of the first center axis L1 of the first flow channel A1. On the other hand, the second center axis L2 of the second flow channel A2 included in the gas flow channel 30 coincides with the center axis J of the guide portion 71, which corresponds to a center axis of the manual valve 70. In other words, the manual valve 70 is located at a position on an extension in the vehicle height direction Z of the second center axis L2 of the second flow channel A2. In the body 20, the solenoid valve 40 and the manual valve 70 are disposed on the order of the solenoid valve 40 and the manual valve 70 from the valve-side opening portion 31*b* side of the gas flow channel 30.

As described above, the first flow channel A1 and the second flow channel A2 intersect with each other in the valve chest S, the solenoid valve 40 is located on the extension line of the first center axis L1 of the first flow channel A1 and the manual valve 70 is located on the extension line of the second center axis L2 of the second flow channel A2, and thus, the solenoid valve 40 and the manual valve 70 are not provided in a same surface of the body 20. In other words, the solenoid valve 40 and the manual valve 70 are disposed in different surfaces of the body 20. More specifically, the solenoid valve 40 is disposed in the front end surface 20*a* of the body 20 and the manual valve 70 is disposed in the lower end surface 20*c* of the body 20. Also, the operation portion 74 of the manual valve 70 is exposed in the lower surface of the vehicle body F of the fuel cell vehicle V, enabling an operation from below the vehicle body F using a tool.

Furthermore, the connector 24 is disposed on the rear end surface 20*b* of the body 20. The connector 24, the solenoid valve 40 and the manual valve 70 are not provided in a single surface of the body 20. In other words, the connector 24, the solenoid valve 40 and the manual valve 70 are disposed in different surfaces of the body 20.

The gas flow channel 30 functions as a charge flow channel at the time of charge of fuel gas from the gas station 13 to the gas tank 11 and functions as a supply flow channel at the time of supply of fuel gas from the gas tank 11 to the fuel cell 12.

Here, pressure in the first flow channel A1 is assumed as pressure P1. Also, pressure in the storage chamber of the gas tank 11 is assumed as tank pressure P2 and pressure in the valve chest S is assumed as valve chest pressure P3. As illustrated in FIG. 3, in a state in which the solenoid valve 40 is in the valve closing position K1 and the tank-side opening portion 33*b* and the second flow channel A2 are brought in communication with each other by the manual valve 70, the pressure P1 is smaller than the tank pressure P2 (P1<P2). In this case, the valve chest S communicates with the storage chamber of the gas tank 11 via the second connection flow channel 32, the guide hole 23*a* and the tank-side opening portion 33*b*, and thus, the valve chest pressure P3 is equal to the tank pressure P2 (P3=P2).

When the fuel gas is charged into the gas tank 11, if the fuel gas is supplied from the gas station 13 with the tank-side opening portion 33*b* brought in communication with the second connection flow channel 32 by the manual valve 70, the pressure P1 in the first flow channel A1 is supply pressure of the fuel gas and the sealing portion 53 of the valve element 51 moves away from the valve seat 26 against the biasing force of the biasing member 50. In other words, the solenoid valve 40 takes the valve opening position K2 and the valve hole 31*a* is opened.

Then, the fuel gas flows in the second connection flow channel 32, the guide hole 23*a* and the tank-side opening portion 33*b* via the valve chest S and is stored in the storage chamber of the gas tank 11. Therefore, at the time of charge of the fuel gas into the gas tank 11, the first flow channel A1 is on the upstream side of the second flow channel A2.

Then, upon the supply of the fuel gas being stopped after an end of the charge of the fuel gas, the pressure P1 in the first flow channel A1 decreases, and the sealing portion 53 of the valve element 51 is seated on the valve seat 26 by the biasing force of the biasing member 50. In other words, the solenoid valve 40 takes the valve closing position K1. In other words, the solenoid valve 40 opens the gas flow channel 30 at the time of charge of the fuel gas into the gas tank 11 and closes the gas flow channel 30 at the time of an end of the charge of the fuel gas.

When the fuel gas in the storage chamber of the gas tank 11 is supplied to the fuel cell 12, the solenoid 55 of the solenoid valve 40 is excited with the tank-side opening portion 33*b* brought in communication with the second connection flow channel 32 by the manual valve 70. The excitation makes the movable core 49 be pulled to the fixed core 47 against the biasing force of the biasing member 50, and the movable core 49 thus comes into contact with the fixed core 47. Then, the valve element 51 attached to the movable core 49 moves away from the valve seat 26 and the sealing portion 53 thus moves away from the valve seat 26. In other words, the solenoid valve 40 takes the valve opening position K2 and the valve hole 31*a* is opened.

Then, the fuel gas in the storage chamber of the gas tank 11 flows through the tank-side opening portion 33*b*, the guide hole 23*a* and the second connection flow channel 32 and flows into the first connection flow channel 31 via the valve chest S. Then, the fuel gas is subjected to pressure reduction by the pressure regulator 14 after flowing through the in-connector flow channel 24*c*, the piping 28 and the supply piping 29*b* and is then supplied to the fuel cell 12. Upon de-excitation of the solenoid 55, the sealing portion 53 of the valve element 51 is seated on the valve seat 26 by, e.g., the biasing force of the biasing member 50. In other words, the solenoid valve 40 takes the valve closing position K1.

Next, operation of the valve device 10 will be described. Also, when the valve device 10 is installed in the fuel cell vehicle V, the piping 28 is connected to the connector 24. Subsequently, where, e.g., an airtightness test of the piping 28 is conducted, the manual valve 70 is manually operated. The manual valve 70 of the valve device 10 is accessed from below the vehicle body F of the fuel cell vehicle V and the operation portion 74 is operated using a manual tool. For example, as illustrated in FIG. 4, the second end 32*b* of the second connection flow channel 32 is closed by the valve portion 72 via manual operation of the operation portion 74. Also, the solenoid valve 40 is positioned in the valve closing position K1. Then, an airtightness test is conducted with both the solenoid valve 40 and the manual valve 70 closed. After an end of the airtightness test, the operation portion 74 is manually operated to make the valve portion 72 open the second end 32*b* of the second connection flow channel 32.

The above embodiment also enables provision of the following effects. In the valve device 10, the first flow channel A1 and the second flow channel A2 intersect with each other in the valve chest S, the extension line of the first center axis L1 of the first flow channel A1 and the center axis N of the solenoid valve 40 coincide with each other and the extension line of the second center axis L2 of the second flow channel A2 coincides with the center axis J of the manual valve 70. In other words, the solenoid valve 40 is disposed in the front end surface 20*a* of the body 20 and the manual valve 70 is disposed in the lower end surface 20*c* of the body 20. Therefore, no peripheral units such as the solenoid valve 40 and connection members including, e.g., the piping 28 are disposed in the lower end surface 20*c* in an axial view of the valve device 10 from below along the center axis J of the manual valve 70. Therefore, when the manual valve 70 is manually operated using a tool, interference of the tool with the solenoid valve 40 and the piping 28 is prevented, enabling curbing a decrease in ease of work the involving manual operation of the manual valve 70.

The piping 28 is connected to the valve-side opening portion 31*b* via the connector 24. The piping 28 is piping in which the fuel gas flows both at the time of charge of the fuel gas into the gas tank 11 and at the time of supply of the fuel gas from the gas tank 11. For example, unlike a case where piping for charge of the gas to the gas tank 11 and piping for supply of the gas from the gas tank 11 are separately connected to the valve-side opening portion 31b, it is possible to reduce the number of piping pieces connected to the valve-side opening portion 31b, enabling reduction in number of connection members that hinder manual operation of the manual valve 70 using a tool.

The intersection portion A of intersection between the first flow channel A1 and the second flow channel A2 is located closer to the inside of the gas tank 11 relative to the valve seat 26 in a part, between the inside of the gas tank 11 and the valve seat 26, of the gas flow channel 30. Therefore, the pressure inside the gas tank 11 consistently acts on the intersection portion A and change in pressure acting on the intersection portion A is small. Accordingly, each time the gas is charged or the gas is supplied, a load due to pressure fluctuation occurring in the intersection portion A can be kept small, and thus, an adverse effect on pressure resistance and fatigue life of the gas flow channel 30 can be curbed.

Next, another operation of the valve device 10 will be described. When the solenoid valve 40 is in the valve closing position K1, under low temperature, the valve element 51 may be fixed in the valve closing position K1 because of freezing of moisture remaining in space between the inner circumferential surface of the sleeve 41 and the outer circumferential surface of the valve element 51 and in space between the inner circumferential surface of the sleeve 41 and an outer circumferential surface of the movable core 49.

In the case of fixation of the closed valve such as above, if it is necessary to release the pressure in the gas tank 11, first, the operation portion 74 of the manual valve 70 is accessed from below the vehicle body F, and the operation portion 74 is manually operated from below the vehicle body F to bring the second connection flow channel 32 into communication with the gas tank 11 via the tank-side opening portion 33b.

Next, as illustrated in FIG. 7, the nut 63 is threadably retracted from the shaft portion 47b to remove the solenoid 55 from the sleeve 41 together with the cover 58. Next, the mounting member 38 is moved from the mounting position T1 to the unmounting position T2 to enable the sleeve 41 to move relative to the body 20 and form the space M.

Then, the sleeve 41 is moved using the space M, and as illustrated in FIG. 8, the annular surface of the sleeve-side restriction portion 43 is moved in the direction away from the body 20 until the annular surface comes into contact with the inner bottom surface of the nut-side restriction portion 38a. In the unmounting position T2, the sealing member 46 does not come off from the small-diameter hole 21a and is in close contact with the outer circumferential surface of the insertion portion 42 and the inner circumferential surface of the small-diameter hole 21a. Therefore, the gas inside the valve chest S does not leak from the first mounting hole 21 to the outside of the body 20.

Then, together with the sleeve 41, the fixed core 47, the movable core 49 and the valve element 51 fixed to the sleeve 41 can be moved collectively. In other words, the solenoid valve 40 can be positioned in the gas release position K3.

As a result, the gas in the gas tank 11 is discharged to the piping 28 via the tank-side opening portion 33b, the guide hole 23a, the second connection flow channel 32, the valve chest S, the first connection flow channel 31, the valve-side opening portion 31b and the in-connector flow channel 24c, whereby pressure release of the gas tank 11 can be performed.

Also, when the solenoid valve 40 is in the valve closing position K1, for example, if pressure release of the gas tank 11 is performed for disposal of the fuel cell vehicle V, as in the above, the mounting member 38 is positioned in the unmounting position T2 to make the sleeve 41 movable and form the space M. Then, the sleeve 41 is moved by the dimension of the space M. Then, together with the sleeve 41, the fixed core 47 moves in the direction away from the body 20. At this time, along with the movement of the fixed core 47, the biasing member 50 changes from the compressed state to an expanded state, and the valve element 51 is released from the biasing force. As a result, upon reception of the pressure in the gas tank 11, the valve element 51 can be moved in a direction away from the valve seat 26 and the solenoid valve 40 can be positioned in the gas release position K3. As a result, the gas in the gas tank 11 is discharged to the piping 28 via the tank-side opening portion 33b, the guide hole 23a, the second connection flow channel 32, the valve chest S, the first connection flow channel 31, the valve-side opening portion 31b and the in-connector flow channel 24c and thus pressure release of the gas tank 11 can be performed.

The above embodiment can be expected to provide the following effects. It is possible to move the sleeve 41 of the solenoid valve 40 in the direction away from the body 20 by the mounting member 38 being moved from the mounting position T1 to the unmounting position T2. Then, it is possible to open the gas flow channel 30 via the valve element 51 by the sleeve 41 being moved in the direction away from the body 20 and thus it is possible to release the pressure inside the gas tank 11 via the valve-side opening portion 31b Therefore, the pressure inside the gas tank 11 can be released merely by operation of the mounting member 38 for mounting the solenoid valve 40 to the body 20.

Also, use of the gas flow channel 30 and the valve-side opening portion 31b of the body 20 as a pressure release flow channel eliminates the need to separately provide dedicated components such as piping and valves for pressure release. Therefore, even the valve device 10 that enables releasing pressure inside the gas tank 11 enables curbing a cost increase and causes neither an increase in size nor a decrease in mountability of the valve device 10.

Upon the mounting member 38 being positioned in the unmounting position T2 and the sleeve 41 being moved in the direction away from the body 20, the fixed core 47 moves away from the movable core 49 and the biasing force of the biasing member 50 can be eliminated. As a result, it is possible to move the valve element 51 away from the valve seat 26 and position the valve element 51 in the gas release position K3 via pressure of the gas inside the gas tank 11. Therefore, even with the configuration that biases the valve element 51 via the biasing member 50, it is possible to position the valve element 51 in the gas release position K3.

The mounting member 38 includes the male thread to be screwed in the large-diameter hole 21b of the body 20 and also includes the nut-side restriction portion 38a that is in contact with the sleeve-side restriction portion 43. Then, upon the mounting member 38 being threadably advanced in the large-diameter hole 21b, the nut-side restriction portion 38a comes into contact with the sleeve-side restriction portion 43, and thus, the sleeve 41 can be mounted to the body 20. On the other hand, upon the mounting member 38 being threadably retracted from the large-diameter hole 21b and being positioned in the unmounting position T2, the nut-side restriction portion 38a is released from the contact with the sleeve-side restriction portion 43, enabling the valve element 51 to be positioned in the position in which the valve element 51 opens the valve-side opening portion 31*b*. Therefore, the valve-side opening portion 31*b* can be opened by the valve element 51, using the nut-like mounting member 38, which is a simple component, enabling the gas inside the gas tank 11 to be discharged to the outside via the valve-side opening portion 31*b*.

The first flow channel A1 and the second flow channel A2 are connected in the valve chest S. The valve chest S is positioned between the inside of the gas tank 11 and the valve seat 26. In other words, the valve chest S is positioned on the gas tank 11 side relative to the valve seat 26, which is a position at which the gas flow channel 30 is opened and closed. Therefore, the pressure inside the gas tank 11 consistently acts on the valve chest S and the pressure less changes. Therefore, each time gas charge or gas supply is performed, a load due to pressure fluctuation occurring in the intersection portion A can be kept small, and thus, an adverse effect on pressure resistance and fatigue life of the gas flow channel 30 can be curbed.

An amount of the threadable retraction of the mounting member 38 for moving the mounting member 38 from the mounting position T1 to the unmounting position T2 is set in advance. The amount of the threadable retraction of the mounting member 38 is set such that when the sleeve 41 is moved, the sleeve-side restriction portion 43 comes into contact with the nut-side restriction portion 38*a* before the sealing member 46 coming off from the small-diameter hole 21*a*. Therefore, even if the mounting member 38 is moved to the unmounting position T2 in order to release the pressure inside the gas tank 11, the sleeve 41 does not come off from the body 20, and thus, work for mounting the sleeve 41 to the body 20 after pressure release while leakage of gas from the first mounting hole 21 being prevented can easily be performed.

Upon the mounting member 38 being positioned in the unmounting position T2 and the sleeve 41 being moved in the direction away from the body 20, it is possible to restrict movement of the sleeve 41 by bringing the sleeve-side restriction portion 43 into contact with the nut-side restriction portion 38*a*. Therefore, it is possible to prevent the sleeve 41 from coming off from the body 20 through the mounting member 38.

The nut-side restriction portion 38*a* is provided in a recessed manner in the inner circumferential portion of the mounting member 38. For example, in comparison with a case where the mounting member 38 has a nut-like shape including no nut-side restriction portion 38*a* and movement of the sleeve 41 is restricted by making the sleeve-side restriction portion 43 come into contact with an end surface of the mounting member 38 positioned in the unmounting position T2, it is possible to reduce an amount of sticking-out of the mounting member 38 from the body 20 and thus contribute to downsizing of the valve device 10.

The mounting member 38 includes the flange 39, and in the mounting position T1, the flange 39 is in contact with the front end surface 20*a* of the body 20. As a result of the flange 39 being brought into contact with the front end surface 20*a* of the body 20, it is possible to curb a distal end portion of the valve element 51 excessively entering the valve hole 31*a*, and thus, the sealing portion 53 can be disposed at a position at which the sealing portion 53 is seated on the valve seat 26.

The fixed core 47 of the solenoid valve 40 includes the shaft portion 47*b* extending through the sleeve 41 and the shaft portion 47*b* extends through the cover 58. Then, the nut 63 threadably engages with the shaft portion 47*b* extending through the cover 58 and as a result of the nut 63 threadably engaging with the shaft portion 47*b*, the cover 58 is integrated with the solenoid valve 40. Also, the solenoid 55 is integrated with the cover 58. Therefore, the cover 58 and the solenoid 55 can be removed from the sleeve 41 by the nut 63 being threadably retracted from the shaft portion 47*b*, enabling the work for moving the mounting member 38 from the mounting position T1 to the unmounting position T2.

Furthermore, since the cover 58 and the solenoid 55 are integrated, the solenoid 55 can be removed from the sleeve 41 simultaneously with removal of the cover 58 from the sleeve 41. For example, in comparison with a case where the solenoid 55 is removed from the sleeve 41 after removal of the cover 58 from the sleeve 41, it is possible to reduce work.

Figure 6:
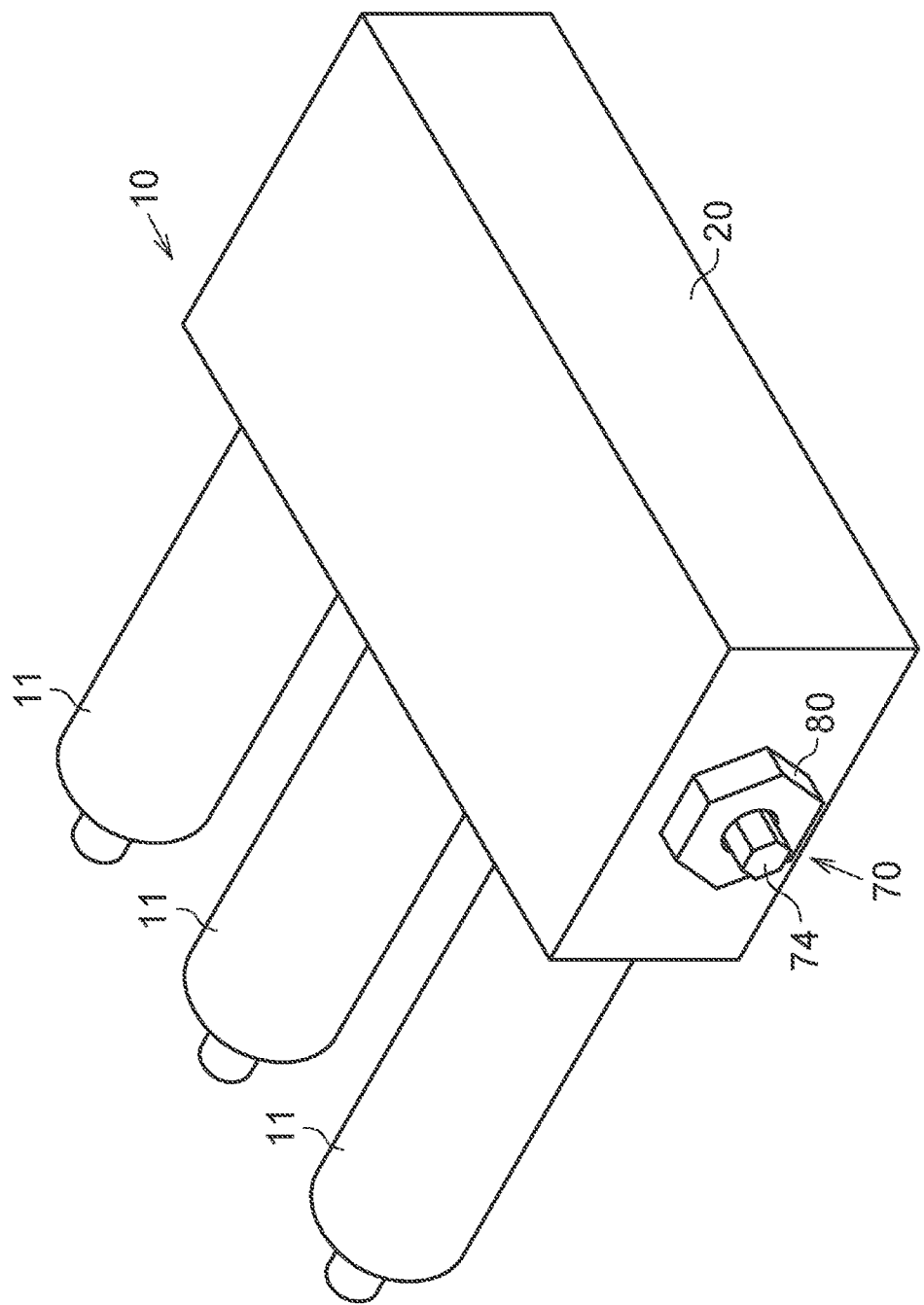
FIG. 6 is a diagram schematically illustrating another example of a valve device.

The present embodiment can be changed as follows. The present embodiment and the following alterations can be combined to one another as long as there is no contradiction in such combination. As illustrated in FIG. 6, in the body, a plurality of the gas tank may be arranged side by side. In this case, the body 20 is provided with a common flow channel through which the tank-side opening portion 33*b* of each gas tank 11 communicates, and this common flow channel is opened and closed by the manual valve 70.

In the gas flow channel 30, a flow channel connecting the valve-side opening portion 31*b* and the valve chest S may be assumed as a second flow channel and a flow channel connecting the guide hole 23*a* to which the tank-side opening portion 33*b* opens and the valve chest S may be assumed as a first flow channel. Then, the valve seat 26 may be formed around a first end of the flow channel connecting the guide hole 23*a* and the valve chest S and the valve seat 26 may be disposed on the first flow channel side relative to the intersection portion A.

The mounting member 38 may be mounted to the body 20 by being press-fitted into the large-diameter hole 21*b* of the first mounting hole 21 and thereby take the mounting position T1 and may take unmounting position T2 by being removed from the body 20.

The male thread of the mounting member 38 is omitted and a projection radially projecting from the outer circumferential surface of the mounting member 38 is formed. Also, the female thread of the large-diameter hole 21*b* is omitted and a groove that receives the projection is formed in a part of the inner circumferential surface of the large-diameter hole 21*b*. The groove includes a circumferential groove extending a circumferential direction of the large-diameter hole 21*b* and an axial groove extending in the vehicle front-rear direction X from one end of the circumferential groove and has an L-shape as viewed from the radially inner side of the large-diameter hole 21*b*. In the case of such configuration as above, in the mounting position T1 of the mounting member 38, the projection is located at the other end of the circumferential groove. Where the mounting member 38 is positioned in the unmounting position T2, the mounting member 38 is rotated and moved to the one end of the circumferential groove and the mounting member 38 is further moved along the axial groove. This configuration also enables the mounting member 38 taking the mounting position T1 and the unmounting position T2 while the mounting member 38 being mounted to the body 20.

A direction in which the valve device 10 is mounted in the vehicle body F may appropriately be changed as long as the operation portion 74 of the manual valve 70 is manually operable. Safety valves or other piping may be connected to the front end surface 20*a* and the rear end surface 20*b* of the body 20.

A plurality of piping pieces may be connected to the valve-side opening portion 31*b* via a diverging connector.

The valve device 10 may be installed in the fuel cell vehicle V such that the first direction of the body 20 is the vehicle right-left direction and the second direction of the body 20 is the vehicle front-rear direction.

The valve device 10 may be installed in the fuel cell vehicle V such that the solenoid valve 40 is mounted in the rear end surface 20b of the body 20 and the connector 24 is mounted in the front end surface 20a of the body 20.

The valve element 51 may be formed in a part of the movable core 49. Although hydrogen gas has been described as the gas, the gas may be a gas other than hydrogen (for example, methane, propane or LPG) or natural gas.

What is claimed is:

1. A valve device comprising:
   a body including a gas flow channel, the gas flow channel making a tank-side opening portion that opens toward an inside of a tank and a valve-side opening portion that opens toward an outside communicate with each other;
   a solenoid valve mounted to the body, the solenoid valve being configured to open and close the gas flow channel;
   a manual valve mounted to the body, the manual valve being configured to open and close the gas flow channel via a manual operation, wherein
   the gas flow channel includes a first flow channel including the valve-side opening portion, and a second flow channel including the tank-side opening portion, and includes an intersection portion in which a first center axis that is a center axis of the first flow channel and a second center axis that is a center axis of the second flow channel intersect with each other, and
   a center axis of the solenoid valve coincides with an extension line of the first center axis and a center axis of the manual valve coincides with an extension line of the second center axis.

2. The valve device according to claim 1, wherein piping in which gas flows both at a time of charge of the gas into the tank and at a time of supply of the gas from the tank is connected to the valve-side opening portion.

3. The valve device according to claim 1, wherein:
   in the gas flow channel, the first flow channel is on an upstream side of the second flow channel at a time of charge of gas into the tank;
   the solenoid valve is configured to open the gas flow channel at the time of the charge of the gas and is configured to close the gas flow channel at an end of the charge of the gas; and
   a valve seat that a valve element of the solenoid valve comes into contact with and moves away from is disposed in the first flow channel that is on a side opposite to the second flow channel relative to the intersection portion.

4. A valve device comprising:
   a body including a gas flow channel, the gas flow channel making a tank-side opening portion that opens toward an inside of a tank and a valve-side opening portion that opens toward an outside communicate with each other;
   a solenoid valve mounted to the body, the solenoid valve being configured to open the gas flow channel in a valve opening position and being configured to close the gas flow channel in a valve closing position; and
   a mounting member configured to mount the solenoid valve to the body, wherein
   the solenoid valve includes a sleeve, a movable core configured to slide inside the sleeve along an axial direction of the sleeve, and a valve element configured to be positioned in the valve opening position and in the valve closing position by moving inside the sleeve along with motion of the movable core,
   the mounting member is capable of taking a mounting position and an unmounting position, the mounting position is a position in which the sleeve is mounted to the body with the sleeve restricted in position such that the solenoid valve is positioned in a use position in which the valve element is capable of taking the valve opening position and the valve closing position, and the unmounting position is a position in which the sleeve is capable of being moved such that the valve element is positioned in a position in which the valve element opens the gas flow channel.

5. The valve device according to claim 4, wherein:
   the solenoid valve includes a fixed core fixed to an inner side of the sleeve, and a biasing member disposed between the fixed core and the movable core in the axial direction of the sleeve and configured to bias the valve element to the valve closing position in the mounting position; and
   the unmounting position is a position in which the valve element is released from the biasing via the biasing member.

6. The valve device according to claim 4, wherein:
   the body has a mounting hole to which a first end in the axial direction of the sleeve is inserted, the mounting hole is a female-threaded hole having a female thread at a part of an inner circumferential surface, the sleeve includes a sleeve-side restriction portion on a second end side relative to the first end of the sleeve, the sleeve-side restriction portion projecting radially from an outer circumferential surface, and includes a sleeve body on the second end side relative to the sleeve-side restriction portion; and
   the mounting member has an annular shape to which the sleeve body is inserted, and includes a male thread at an outer circumferential surface, the male thread threadably engaging with the mounting hole, and includes a nut-side restriction portion that comes into contact with the sleeve-side restriction portion in the mounting position.

7. The valve device according to claim 4, wherein:
   the gas flow channel includes a first flow channel that is on an upstream side at a time of charge of gas into the tank, a second flow channel that is on a downstream side relative to the first flow channel at the time of the charge of the gas into the tank, and an intersection portion in which the first flow channel and the second flow channel intersect with each other; and
   in the gas flow channel, the solenoid valve that takes the valve opening position at the time of the charge of the gas and that takes the valve closing position at an end of the charge of the gas is disposed, and a valve seat that the valve element comes into contact with and moves away from is disposed in the first flow channel that is on a side opposite to the second flow channel relative to the intersection portion.

* * * * *